United States Patent
Kroppe

(10) Patent No.: US 7,331,896 B1
(45) Date of Patent: Feb. 19, 2008

(54) TORQUE CONTROL SYSTEM FOR ALL-WHEEL DRIVE DRIVETRAIN

(75) Inventor: William J Kroppe, Wyomissing, PA (US)

(73) Assignee: Dana Corporation, Toledo, OH (US)

( * ) Notice: Subject to any disclaimer, the term of this patent is extended or adjusted under 35 U.S.C. 154(b) by 50 days.

(21) Appl. No.: 11/108,835

(22) Filed: Apr. 19, 2005

(51) Int. Cl.
*F16H 48/02* (2006.01)

(52) U.S. Cl. ....................................... 475/221

(58) Field of Classification Search ............... 475/200, 475/201, 203, 206, 221; 180/245, 250
See application file for complete search history.

(56) References Cited

U.S. PATENT DOCUMENTS

| | | | |
|---|---|---|---|
| 4,718,301 A | 1/1988 | Friedrich | |
| 4,729,259 A | 3/1988 | Lanzer | |
| 4,729,262 A | 3/1988 | Lanzer | |
| 4,747,464 A | 5/1988 | Lanzer | |
| 4,747,643 A | 5/1988 | Lanzer | |
| 5,195,037 A | 3/1993 | Tezuka | |
| 6,533,692 B1 * | 3/2003 | Bowen | 475/5 |
| 6,598,721 B2 | 7/2003 | Schmidl | |
| 6,857,985 B2 * | 2/2005 | Williams | 477/5 |
| 2003/0195075 A1 | 10/2003 | Bowen | |
| 2006/0207854 A1 * | 9/2006 | Baasch et al. | 192/48.2 |

* cited by examiner

*Primary Examiner*—Sherry Estremsky
*Assistant Examiner*—Edwin A Young
(74) *Attorney, Agent, or Firm*—Berenato, White & Stavish

(57) ABSTRACT

A drivetrain of an all-wheel drive motor vehicle provided for selective actuation and control of the torque distribution between first and second drive axle assemblies to match various vehicle operating conditions. The drivetrain comprises a power drive unit including a prime mover, the first drive axle assembly driven by the power drive unit to drive a first set of wheels, the second drive axle assembly driven by the power drive unit to drive a second set of wheels, a first clutch unit provided to disconnect the first drive axle assembly from the power drive unit, and a second clutch unit provided to disconnect the second drive axle assembly from the power drive unit.

20 Claims, 3 Drawing Sheets

TORQUE CONTROL SYSTEM FOR ALL-WHEEL DRIVE DRIVETRAIN

BACKGROUND OF THE INVENTION

1. Field of the Invention

The present invention relates to torque control systems for motor vehicles in general, and more particularly to a torque control system for a drivetrain of all-wheel drive motor vehicles.

2. Description of the Prior Art

Many modern motor vehicles employ all-wheel drive (AWD) systems in which engine torque could be delivered to both front and rear wheels of the vehicle. These systems have been marketed in a number of forms, such as constant AWD systems, part-time AWD systems and on-demand AWD systems.

Some AWD systems have a transfer case, which is controlled by the operator to select two wheel or four-wheel drive. If the operator selects the four-wheel drive condition, the vehicle drives all four wheels continuously. Some of these systems have employed overrunning clutches at two of the wheel to alleviate some of the disadvantages of AWD which result from tire pressure differential and cornering to name a few.

Other AWD systems work automatically and do not require a vehicle operator to intentionally select this condition or to actively engage the system, and they do not have a low range. AWD systems automatically split engine torque between the front and rear wheels as needed. These systems often employ a viscous clutch in the center differential to transfer torque to the drive wheels that are not sensed as slipping. In tight cornering situations and during towing, these AWD systems present a disadvantage. In cornering situations, noise and vibration can result from the AWD system being engaged. While this is not detrimental to the powertrain during short durations, it can be disconcerting to the operator. The AWD system is generally an on-road system and is not designed for off-road use.

Typically, the AWD motor vehicles are provided with a central (or inter-axle) differential. In order to widely control the distribution of the torque, it is necessary that the central differential is arranged to unequally distribute the torque to the front wheels and the rear wheels. There are two methods in the unequal distributing system. One of the methods is a front-weighted distribution which is weighted to the front wheels, and the other is a rear-weighted distribution which is weighted to the rear wheels. In the front-wheel weighted system, larger torque is transmitted to the front wheels. Accordingly, in the front-weighted system, although the vehicle has good straight-ahead stability, it is inferior in steerability because of drifting out of a course. In the rear-wheel weighted system, larger torque is transmitted to the rear wheels. The vehicle has good steerability and driveability on a dry road. However, the vehicle is liable to spin on a slippery road. On the other hand, a disadvantage of the all-wheel drive vehicle is that all the four wheels may slip (slipping spin) at the same time, causing difficulty in driving.

However, in the conventional systems, the standard torque distribution ratio determined by the ratio of the pitch circles can not be changed, unless the diameters of differential gears change. However, it is difficult to change the diameters because of a limitation of space. Since the distribution of torque to the rear wheels can not be set to a large value, the control range of the torque distribution is small. In addition, if the vehicle is driven on a road surface having a low coefficient of friction under slipping conditions and the speed difference is small, the torque distribution can not be controlled. Further, in the conventional systems for the fixed torque distribution control, the control range of the driving conditions is limited to a particular condition such as deceleration. Therefore, it is desirable to control the distribution at a fixed ratio in a wide range of driving conditions including acceleration and steering operation.

Thus, known drivetrains of the all-wheel drive motor vehicles, including but not limited to those discussed above, although proven to be acceptable for various vehicular driveline applications, are nevertheless susceptible to improvements that may enhance their performance and cost. With this in mind, a need exists to develop an improved drivetrain of an all-wheel drive motor vehicle that advances the art.

SUMMARY OF THE INVENTION

The present invention provides an improved drivetrain of an all-wheel drive (AWD) motor vehicle allowing an infinitely variable torque distribution between drive axle assemblies of the motor vehicle.

The drivetrain in accordance with the present invention comprises a power drive unit including a prime mover, the first drive axle assembly driven by the power drive unit to drive a first set of wheels, the second drive axle assembly driven by the power drive unit to drive a second set of wheels, a first clutch unit provided to disconnect the first drive axle assembly from the power drive unit, and a second clutch unit provided to disconnect the second drive axle assembly from the power drive unit.

Such an arrangement of the drivetrain of the all wheel drive motor vehicle allows for selective actuation and control of the torque distribution between first and second drive axle assemblies to match various vehicle operating conditions.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiments of the present invention will now be described with the reference to accompanying drawings.

Figure 1:
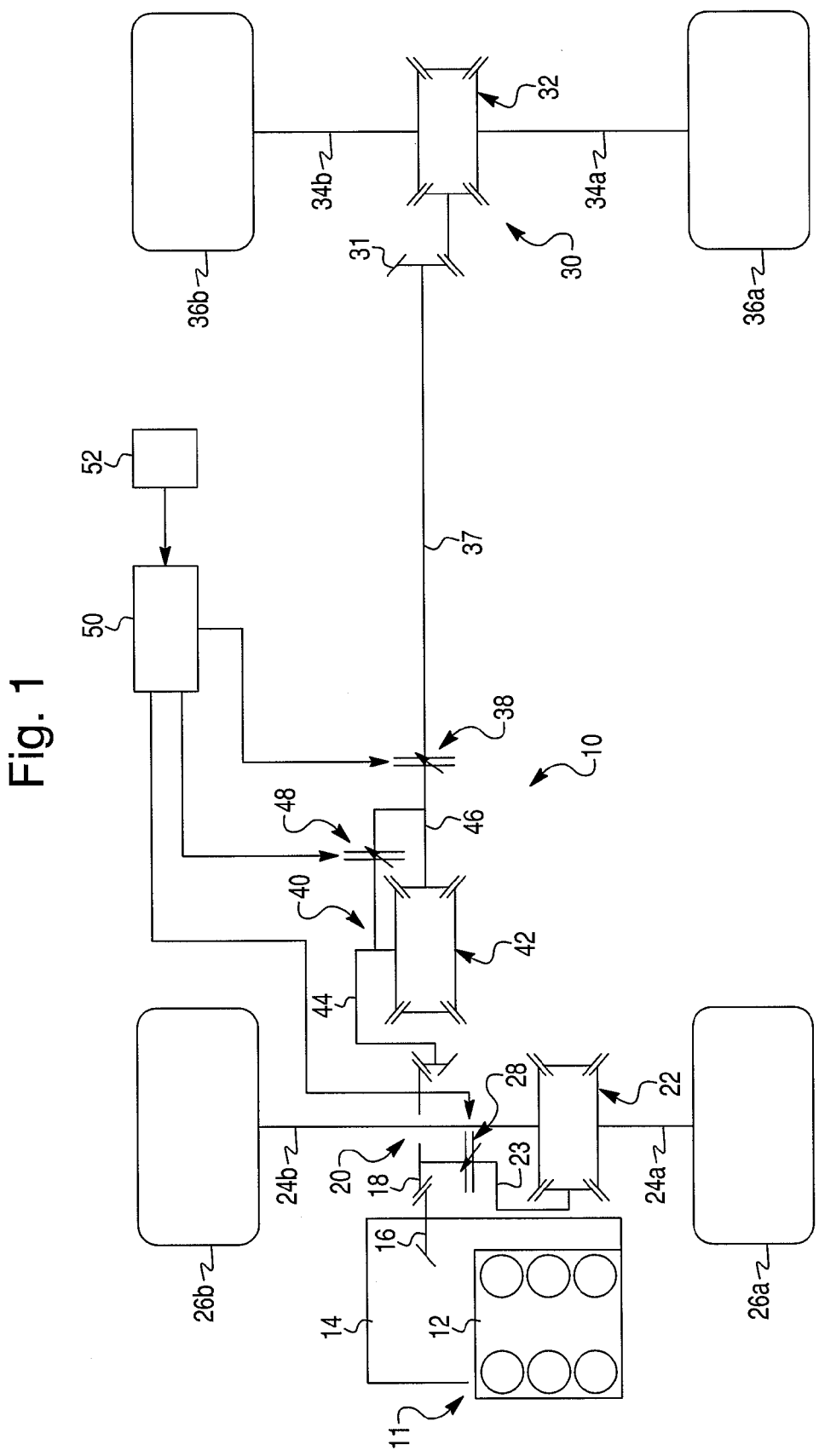
FIG. 1 is a schematic diagram showing a drivetrain of an all-wheel drive motor vehicle in accordance with a first exemplary embodiment of the present invention.

FIG. 1 schematically depicts a drivetrain 10 of an all-wheel drive (AWD) motor vehicle in accordance with the first exemplary embodiment of the present invention.

The AWD drivetrain 10 comprises a power drive unit 11, a selectively operable front drive axle assembly 20 selectively coupled to the power drive unit 11, a selectively operable rear drive axle assembly 30 and a power transfer unit 40 operably and selectively connecting the power drive unit 11 to the rear drive axle assembly 30. The power drive unit 11 includes an internal combustion engine (ICE) 12 mounted to a front end of the motor vehicle and coupled to an automatic or manual transmission 14. The power drive unit 11 is provided for selectively driving both or one of the front drive axle assembly 20 and the rear drive axle assembly 30.

The front drive axle assembly 20 includes a front differential assembly 22 rotatable by a drive torque from the engine 12 through an output member 16 of the transmission 14 and a drive member 18 of the power drive unit 11, and two front axle shafts 24a and 24b outwardly extending from the front differential assembly 22 and drivingly coupled to front wheels 26a and 26b, respectively. According to the first exemplary embodiment of the present invention, the output member 16 and the drive member 18 are in the form of helical or bevel gears.

As further illustrated in FIG. 1, the front differential assembly 22 of the front drive axle assembly 20 is selectively coupled to the drive gear 18 of the power drive unit 11 through a variably controlled first clutch unit 28. In other words, the first clutch unit 28 is provided for selectively connecting and disconnecting the front drive axle assembly 20 to and from the power drive unit 11.

The rear drive axle assembly 30 includes a rear differential assembly 32 and two rear axle shafts 34a and 34b outwardly extending from the rear differential assembly 32 and drivingly coupled to rear wheels 36a and 36b, respectively. The rear differential assembly 32 is driven by a rear drive member in the form of a pinion gear 31. The rear drive member 31 is driven by a propeller shaft 37 which, in turn, is selectively driven by the power transfer unit 40.

The power transfer unit 40 includes an inter-axle differential assembly 42 provided between the front and rear drive axle assemblies 20 and 30, respectively. The power transfer unit 40 further includes a third (or lock-up) clutch unit 48 provided for non-rotatably connecting an input member (or shaft) 44 and an output shaft (or member) 46 of the inter-axle differential assembly 42. In other words, the third clutch unit 48 is provided for locking-up the inter-axle differential assembly 42. As illustrated, the input member 44 of the inter-axle differential assembly 42 is drivingly coupled with the drive gear 18 of the power drive unit 11.

Furthermore, the output shaft 46 of the inter-axle differential assembly 42 is selectively coupled to the propeller shaft 37 through a variably controlled second clutch unit 38. In other words, the second clutch unit 38 is provided for selectively connecting and disconnecting the rear drive axle assembly 30 to and from the power drive unit 11.

The differential assemblies 22, 32 and 42 may be of any appropriate type known in the art, such as bevel or spur gear differentials. Moreover, the differential assemblies 22, 32 and 42 may be open or limited-slip type differentials.

The first, second and third clutch units 28, 38 and 48 may be of any appropriate type known in the art, such as friction type, magneto-rheological type, magnetic-particle type, etc. Preferably, the clutch units 28, 38 and 48 are friction clutch assemblies including at least one first friction element non-rotatably coupled to an input member and at least one second friction element non-rotatably coupled to an output member. More preferably, the friction clutch units 28, 38 and 48 include a friction clutch pack including a plurality of alternating input and output friction elements.

More specifically, the first clutch unit 28 selectively engages and disengages (couples) the drive member 18 of the power drive unit 11 (the input member of the clutch unit 28) with an input member 23 of the front differential assembly 22 (the output member of the clutch unit 28). The second clutch unit 38 selectively engages and disengages the output shaft 46 of the inter-axle differential assembly 42 (the input member of the clutch unit 38) with the propeller shaft 37 of the drivetrain 10 (the output member of the clutch unit 38). Subsequently, the third clutch unit 38 selectively engages and disengages the input member 44 of the inter-axle differential assembly 42 (the input member of the clutch unit 48) with the output shaft 46 of the inter-axle differential assembly 42 (the output member of the clutch unit 48).

Preferably, the friction clutch units 28, 38 and 48 are hydraulically actuated friction clutch assemblies. Alternatively, the friction clutch units 28, 38 and 48 may be pneumatically, electromechanically or magnetically actuated. Further preferably, each of the clutch units 28, 38 and 48 is a variably controlled friction clutch assembly providing infinitely variable torque distribution from the input member to the output member thereof between a fully "ON" position and a fully "OFF" position. More specifically, in the fully "ON" position each of the friction clutch units 28, 38 and 48 is completely engaged so that 100% of torque is transferred from the input member to the output member thereof, while in the fully "OFF" position each of the friction clutch units 28, 38 and 48 is completely disengaged so that no torque is transferred from the input member to the output member thereof. This provides an opportunity to dynamically control the frictional engagement of the clutch units 28, 38 and 48 between the fully "ON" and "OFF" conditions for traction enhancement of the motor vehicle. Thus, the amount of torque transferred through each of the friction clutch units 28, 38 and 48 can be limited and optimized for selectively controlling torque distribution between the front and rear drive axle assemblies 20 and 30 to match various vehicle operating conditions. The amount of drive torque transferred is proportional to the magnitude of the clutch engagement force exerted by the (hydraulic) clutch actuator.

The friction clutch units 28, 38 and 48 are independently controlled, preferably by an electronic control unit (ECU) 50 based on one or more operating parameters of the motor vehicle as control inputs, such as a vehicle speed, steering angle, wheel speeds, a vehicle yaw rate, a vehicle lateral acceleration, an engine throttle position, a brake application, etc. The above operating parameters are monitored by one or more electronic sensors 52.

In operation, the friction clutch units 28, 38 and 48 of the drivetrain 10 according to the present invention are selectively and are independently controlled by the ECU 50 to allow a number of various modes of operation, such as the following:

a rear wheel drive mode: the first friction clutch unit 28 is in "OFF" position to disengage the front drive axle assembly 20, while the second and third friction clutch units 38 and 48 are in "ON" positions so as to engage the rear drive axle assembly 30 and lock the inter-axle differential assembly 42, thus only the rear drive axle assembly 30 is driven by the power drive unit 11;

a front wheel drive mode: the first friction clutch unit 28 is in "ON" position to engage the front drive axle assembly 20, while the second friction clutch units 38 is in "OFF" position so as to disengage the rear drive axle assembly 30, thus only the front drive axle assembly 20 is driven by the power drive unit 11;

all wheel drive mode: the first and second friction clutch units 28 and 38 in "ON" positions so as to engage the front and rear drive axle assemblies 20 and 30, while the third friction clutch units 48 is in "OFF" position, thus both the front and rear drive axle assemblies 20 and 30 are driven by the power drive unit 11 so that the drive torque of the engine 12 is distributed to the front and rear drive axle assemblies 20 and 30 through the inter-axle differential assembly 42;

direct all wheel drive mode: all the friction clutch units 28, 38 and 48 are in "ON" positions so as to engage the front and rear drive axle assemblies 20 and 30 and to lock the inter-axle differential assembly 42; thus both the front and rear drive axle assemblies 20 and 30 are driven by the power drive unit 11 so that the drive torque of the engine 12 is distributed to the front and rear drive axle assemblies 20 and 30 through the locked inter-axle differential assembly 42.

One of ordinary skill in the art would appreciate that by modulating the frictional engagement of the clutch units 28, 38 and 48 between fully "ON" and "OFF" position infinitely variable torque distribution between the front and rear drive axle assemblies 20 and 30 could be achieved to match particular operating conditions of the motor vehicle.

Figure 2:
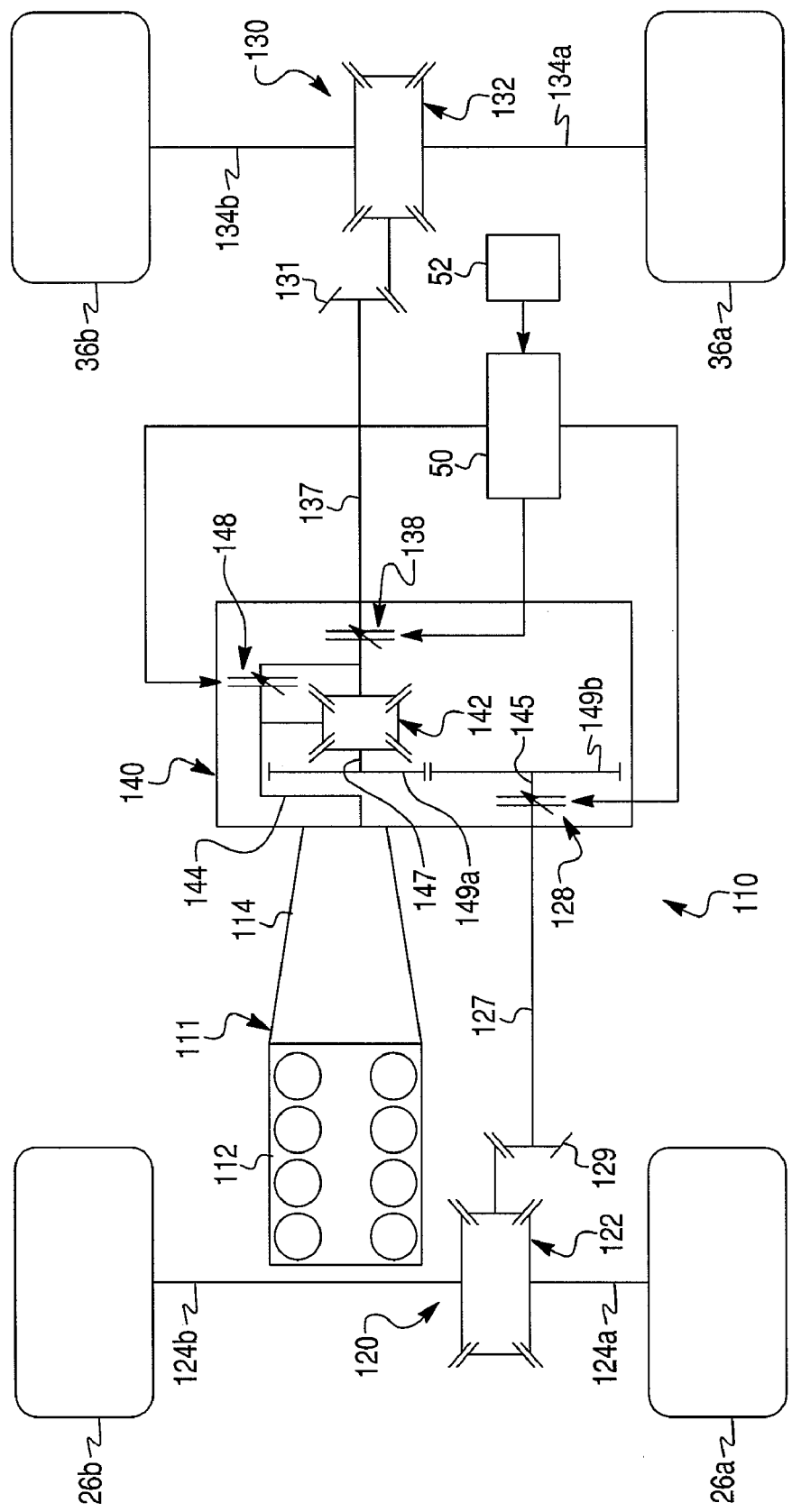
FIG. 2 is a schematic diagram showing the drivetrain of the all-wheel drive motor vehicle in accordance with a second exemplary embodiment of the present invention.

FIG. 2 of the drawings illustrates a second exemplary embodiment of a drivetrain, depicted with the reference numeral 110, of an all-wheel-drive motor vehicle. Components, which are unchanged from, or function in the same way as in the first exemplary embodiment depicted in FIG. 1 are labeled with the same reference characters. The drivetrain 110 of FIG. 2 substantially corresponds to the drivetrain 10 of FIG. 1, and only the portions, which differ, will therefore be explained in detail below, sometimes without describing detail since similarities between the corresponding parts in the two embodiments will be readily perceived by the reader.

More specifically, according to the second exemplary, embodiment of the present invention illustrated in FIG. 2, the drivetrain 110 comprises a power drive unit 111, a selectively operable front drive axle assembly 120, a selectively operable rear drive axle assembly 130 and a power transfer unit (or transfer case) 140 operably and selectively connecting the power drive unit 111 to the front and rear drive axle assemblies 120 and 130, respectively. The power drive unit 111 includes an internal combustion engine (ICE) 112 mounted to a front end of the motor vehicle and coupled to a transmission 114. The power drive unit 111 is provided for selectively driving both or one of the front drive axle assembly 120 and the rear drive axle assembly 130.

The front drive axle assembly 120 includes a front differential assembly 122 and two front axle shafts 124a and 124b outwardly extending from the front differential assembly 122 and drivingly coupled to front wheels 26a and 26b, respectively. The front differential assembly 122 is driven by a front input member in the form of a front pinion gear 129. The front input member 129 is driven by a front propeller shaft 127 which, in turn, is selectively driven by the power transfer unit 140.

The rear drive axle assembly 130 includes a rear differential assembly 132 and two rear axle shafts 134a and 134b outwardly extending from the rear differential assembly 132 and drivingly coupled to rear wheels 36a and 36b, respectively. The rear differential assembly 132 is driven by a rear drive member in the form of a rear pinion gear 131. The rear drive member 131 is driven by a rear propeller shaft 137 which, in turn, is selectively driven by the power transfer unit 140.

The power transfer unit 140 includes an inter-axle differential assembly 142 provided between the front and rear drive axle assemblies 120 and 130, respectively, for distributing drive torque of the power drive unit 111 therebetween.

The power transfer unit 140 further includes an input member (or shaft) 144 extending from the power drive unit 111 for driving the inter-axle differential assembly 142, a front output shaft 145 and a rear output shaft 146. As illustrated in FIG. 2, a front output shaft 147 of the inter-axle differential assembly 142 is driving a drive gear 149a in mesh with a driven gear 149b. The driven gear 149b is non-rotatably coupled with the front output shaft 145 of the power transfer unit 140.

The differential assemblies 122, 132 and 142 may be of any appropriate type known in the art, such as bevel or spur gear differentials. Moreover, the differential assemblies 122, 132 and 142 may be open or limited-slip type differentials.

The inter-axle differential assembly 142 includes a selectively controlled first, second and third clutch units 128, 138 and 148, respectively, provided for selectively operating the torque distribution between the front and rear drive axle assemblies 120 and 130, respectively. More specifically, the front output shaft 145 is selectively coupled to the front propeller shaft 127, thus to the front drive axle assembly 120, through the first clutch unit 128. The rear output shaft 146 is selectively coupled to the rear propeller shaft 137, thus to the rear drive axle assembly 130, through the second clutch unit 138. The third (or lock-up) clutch unit 148 is provided for non-rotatably connecting the input member 144 and the rear output shaft 146 of the inter-axle differential assembly 142. In other words, the third clutch unit 148 is provided for locking-up the inter-axle differential assembly 142.

Preferably, similar to the clutch units 28, 38 and 48 of the first exemplary embodiment of the present invention, the first, second and third clutch units 128, 138 and 148 are hydraulically actuated, variably controlled multi-plate friction clutch assemblies providing infinitely variable torque distribution from input members to output members thereof between a fully "ON" position and a fully "OFF" position. Thus, the amount of torque transferred through each of the friction clutch units 128, 138 and 148 can be limited and optimized for selectively controlling torque distribution between the front and rear drive axle assemblies 120 and 130 to match various vehicle operating conditions by controlling the magnitude of the clutch engagement force exerted by the clutch actuator.

Again, similar to the drivetrain 10 of the first exemplary embodiment of the present invention, the friction clutch units 128, 138 and 148 are independently controlled, preferably by an electronic control unit (ECU) 50 based on one or more vehicle parameters as control inputs 52, such as a vehicle speed, steering angle, wheel speeds, a vehicle yaw rate, a vehicle lateral acceleration, an engine throttle position, a brake application, etc. Consequently, the ECU 50 controls torque distribution between the front and rear drive axle assemblies 120 and 130 to match particular operating conditions of the motor vehicle.

Figure 3:
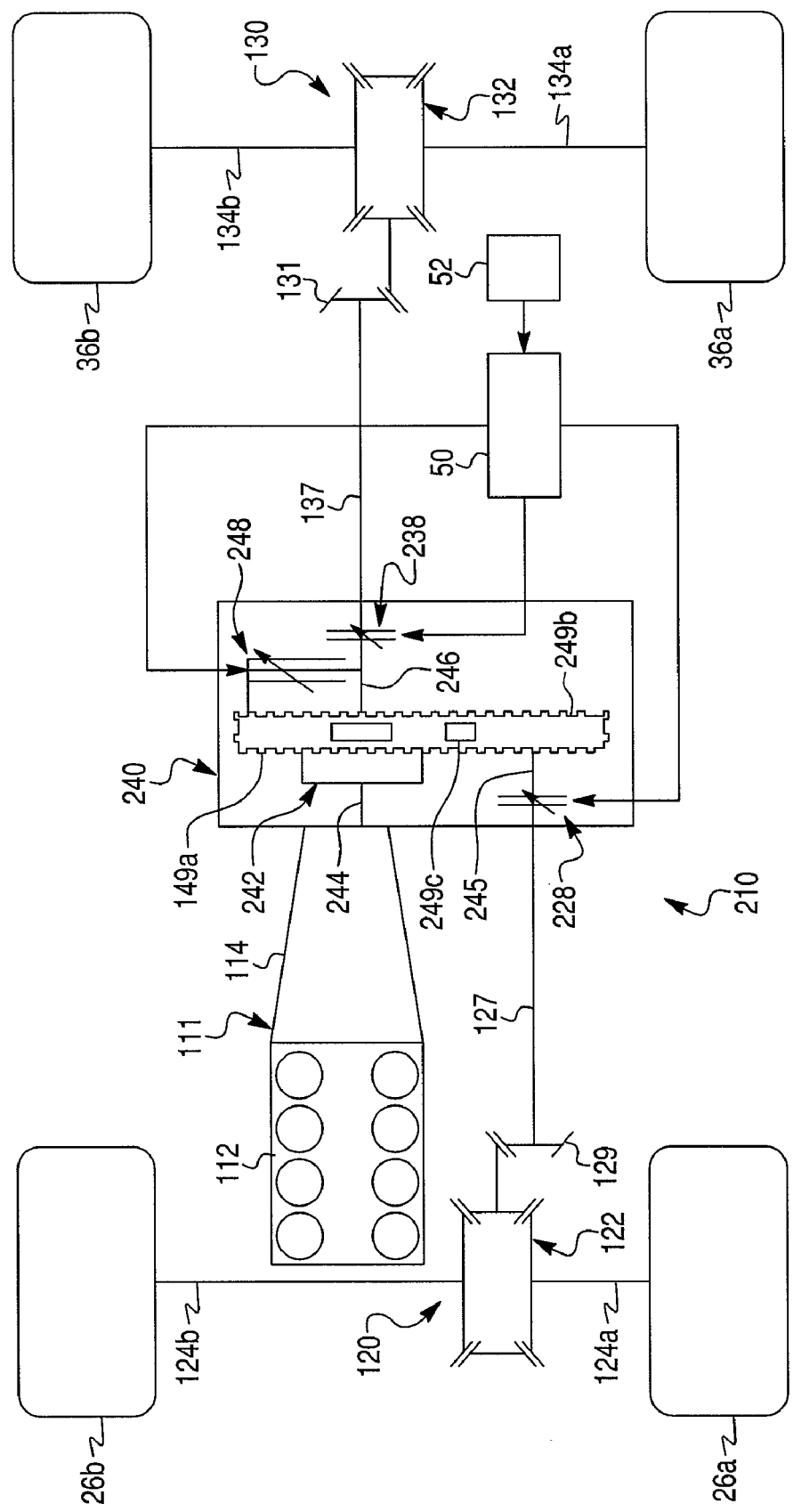
FIG. 3 is a schematic diagram showing the drivetrain of the all-wheel drive motor vehicle in accordance with a third exemplary embodiment of the present invention.

FIG. 3 of the drawings illustrates a third exemplary embodiment of a drivetrain, depicted with the reference numeral 210, of a all-wheel-drive motor vehicle. Components, which are unchanged from, or function in the same way as in the second exemplary embodiment depicted in FIG. 2 are labeled with the same reference characters. The drivetrain 210 of FIG. 3 substantially corresponds to the drivetrain 110 of FIG. 2, and only the portions, which differ, will therefore be explained in detail below, sometimes without describing detail since similarities between the corresponding parts in the two embodiments will be readily perceived by the reader.

More specifically, according to the third exemplary embodiment of the present invention illustrated in FIG. 3, the drivetrain 210 comprises a power drive unit 111, a selectively operable front drive axle assembly 120, a selectively operable rear drive axle assembly 130 and a power transfer unit (or transfer case) 240 operably and selectively connecting the power drive unit 111 to the front and rear drive axle assemblies 120 and 130, respectively. The power drive unit 111 includes an internal combustion engine (ICE) 112 mounted to a front end of the motor vehicle and coupled to a transmission 114. The power drive unit 111 is provided for selectively driving both or one of the front drive axle assembly 120 and the rear drive axle assembly 130.

The front drive axle assembly 120 includes a front differential assembly 122 and two front axle shafts 124a and 124b outwardly extending from the front differential assembly 122 and drivingly coupled to front wheels 26a and 26b, respectively. The front differential assembly 122 is driven by a front drive member in the form of a front pinion gear 129. The front drive member 129 is driven by a front propeller shaft 127 which, in turn, is selectively driven by the power transfer unit 140.

The rear drive axle assembly 130 includes a rear differential assembly 132 and two rear axle shafts 134a and 134b outwardly extending from the rear differential assembly 132 and drivingly coupled to rear wheels 36a and 36b, respectively. The rear differential assembly 132 is driven by a rear drive member in the form of a rear pinion gear 131. The rear drive member 131 is driven by a rear propeller shaft 137 which, in turn, is selectively driven by the power transfer unit 140.

The power transfer unit 240 includes an inter-axle differential assembly 242 provided between the front and rear drive axle assemblies 120 and 130, respectively, for distributing drive torque of the power drive unit 111 therebetween. The differential assembly 242 may be of any appropriate type known in the art, such as bevel or spur gear differential. Moreover, the differential assembly 242 may be open or limited-slip type differential. The power transfer unit 240 further includes an input member (or shaft) 244 extending from the power drive unit 111 for driving the inter-axle differential assembly 242, a front output shaft 245 and a rear output shaft 146. As illustrated in FIG. 3, a front output member of the inter-axle differential assembly 242 is driving a drive sprocket 249a transferring torque to a driven sprocket 249b through an endless element 249c, such as toothed belt or chain. The driven sprocket 249b is non-rotatably coupled with the front output shaft 245 of the power transfer unit 240.

The inter-axle differential assembly 242 includes a selectively controlled first, second and third clutch units 228, 238 and 248, respectively, provided for selectively operating the torque distribution between the front and rear drive axle assemblies 120 and 130, respectively. More specifically, the front output shaft 245 is selectively coupled to the front propeller shaft 127, thus to the front drive axle assembly 120, through the first clutch unit 228. The rear output shaft 246 is selectively coupled to the rear propeller shaft 137, thus to the rear drive axle assembly 130, through the second clutch unit 238. The third (or lock-up) clutch unit 248 is provided for non-rotatably connecting the drive sprocket 249a and the rear output shaft 246 of the inter-axle differential assembly 242. In other words, the third clutch unit 248 is provided for locking-up the inter-axle differential assembly 242.

Preferably, similar to the clutch units 28, 38 and 48 of the first exemplary embodiment of the present invention, the first, second and third clutch units 228, 238 and 248 are hydraulically actuated, variably controlled multi-plate friction clutch assemblies providing infinitely variable torque distribution from input members to output members thereof between a fully "ON" position and a fully "OFF" position. Thus, the amount of torque transferred through each of the friction clutch units 228, 238 and 248 can be limited and optimized for selectively controlling torque distribution between the front and rear drive axle assemblies 120 and 130 to match various vehicle operating conditions by controlling the magnitude of the clutch engagement force exerted by the clutch actuator.

Again, similar to the drivetrain 10 of the first exemplary embodiment of the present invention, the friction clutch units 228, 238 and 248 are independently controlled, preferably by an electronic control unit (ECU) 50 based on one or more vehicle parameters as control inputs 52, such as a vehicle speed, steering angle, wheel speeds, a vehicle yaw rate, a vehicle lateral acceleration, an engine throttle position, a brake application, etc. Consequently, the ECU 50 controls torque distribution between the front and rear drive axle assemblies 120 and 130 to match particular operating conditions of the motor vehicle.

Therefore, the drivetrain in accordance with the present invention represents a novel arrangement of the selectively operable drivetrain for the AWD motor vehicles providing selective actuation and control of the torque distribution between the front and rear drive axle assemblies to match various vehicle operating conditions. The drivetrain of the present invention allows for an infinitely variable torque distribution between the front and rear drive axle assemblies of the AWD motor vehicle.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A drivetrain of a motor vehicle, said drivetrain comprising:
   a power drive unit including a prime mover;
   a first drive axle assembly operatively coupled to said power drive unit to drive a first set of wheels;
   a second drive axle assembly operatively coupled to said power drive unit to drive a second set of wheels;
   a first clutch unit provided to disconnect said first drive axle assembly from said power drive unit; and
   a second clutch unit provided to disconnect said second drive axle assembly from said power drive unit,
   wherein said power drive unit being able to drive said first drive axle assembly when said second drive axle assembly is disconnected and said second drive axle assembly when said first drive axle assembly is disconnected.

2. The drivetrain as defined in claim 1, wherein said first drive axle assembly includes a first differential assembly.

3. The drivetrain as defined in claim 2, wherein said first clutch unit includes at least one first friction element non-rotatably coupled to an input member of said first differential assembly and at least one second friction element non-rotatably coupled to a drive member of said power drive unit.

4. The drivetrain as defined in claim 1, wherein said second drive axle assembly includes a second differential assembly.

5. The drivetrain as defined in claim 1, further comprising a power transfer unit having an input member drivingly connected to said power drive unit and a first output shaft operably connected to said second drive axle assembly.

6. The drivetrain as defined in claim 5, wherein said power transfer unit includes an inter-axle differential assembly driven by said power drive unit and selectively coupled to said second drive axle assembly through said second clutch unit.

7. The drivetrain as defined in claim 6, wherein said power transfer unit further includes a third clutch unit provided for non-rotatably connecting an input member and an output member of said inter-axle differential assembly relative to each other.

8. The drivetrain as defined in claim 7, wherein said third clutch unit is one of a hydraulically, pneumatically, electromechanically and magnetically actuated friction clutch assembly.

9. The drivetrain as defined in claim 7, wherein said third clutch unit is a variably controlled friction clutch assembly providing infinitely variable torque transfer from said input member to said output member of said third clutch unit between a fully engaged position and a fully disengaged position.

10. The drivetrain as defined in claim 7, further including an electronic control unit provided for independently controlling said first, second and third clutch units based on at least one operating parameter of said motor vehicle.

11. The drivetrain as defined in claim 10, wherein said at least one operating parameter is at least one of a vehicle speed, steering angle, wheel speeds, a vehicle yaw rate, a vehicle lateral acceleration, an engine throttle position and a brake application.

12. The drivetrain as defined in claim 6, wherein said second drive axle assembly includes a second differential assembly.

13. The drivetrain as defined in claim 12, wherein said second clutch unit includes at least one first friction element non-rotatably coupled to an input member of said second differential assembly and at least one second friction element non-rotatably coupled to said first output shaft of said power transfer unit.

14. The drivetrain as defined in claim 6, wherein said power transfer unit further includes a second output shaft operatively coupled to said first drive axle assembly.

15. The drivetrain as defined in claim 14, wherein said first drive axle assembly includes a first differential assembly and said second drive axle assembly includes a second differential assembly.

16. The drivetrain as defined in claim 15, wherein said first clutch unit includes at least one first friction element non-rotatably coupled to an input member of said first differential assembly and at least one second friction element non-rotatably coupled to said second output shaft of said power transfer unit; and wherein said second clutch unit includes at least one first friction element non-rotatably coupled to an input member of said second differential assembly and at least one second friction element non-rotatably coupled to said first output shaft of said power transfer unit.

17. The drivetrain as defined in claim 1, wherein said first and second clutch units are one of hydraulically, pneumatically, electromechanically and magnetically actuated friction clutch assemblies.

18. The drivetrain as defined in claim 1, wherein each of said first and second clutch units is a variably controlled friction clutch assembly providing infinitely variable torque transfer from an input member to an output member thereof between a fully engaged position and a fully disengaged position.

19. The drivetrain as defined in claim 1, further including an electronic control unit provided for independently controlling said first and second clutch units based on at least one operating parameter of said motor vehicle.

20. The drivetrain as defined in claim 19, wherein said at least one operating parameter is at least one of a vehicle speed, steering angle, wheel speeds, a vehicle yaw rate, a vehicle lateral acceleration, an engine throttle position and a brake application.

* * * * *